Sept. 29, 1953 W. W. BOELENS 2,654,026

RADIO CIRCUIT ARRANGEMENT

Filed Oct. 22, 1949

INVENTOR.
WILLEM WIGGER BOELENS
BY Fred M Vogel
AGENT

Patented Sept. 29, 1953

2,654,026

UNITED STATES PATENT OFFICE 2,654,026

RADIO CIRCUIT ARRANGEMENT

Willem Wigger Boelens, Eindhoven, Netherlands, assignor to Hartford National Bank and Trust Company, Hartford, Conn., as trustee Application October 22, 1949, Serial No. 122,951
In the Netherlands October 27, 1948

3 Claims. (Cl. 250—20)

Figures 1, 2:
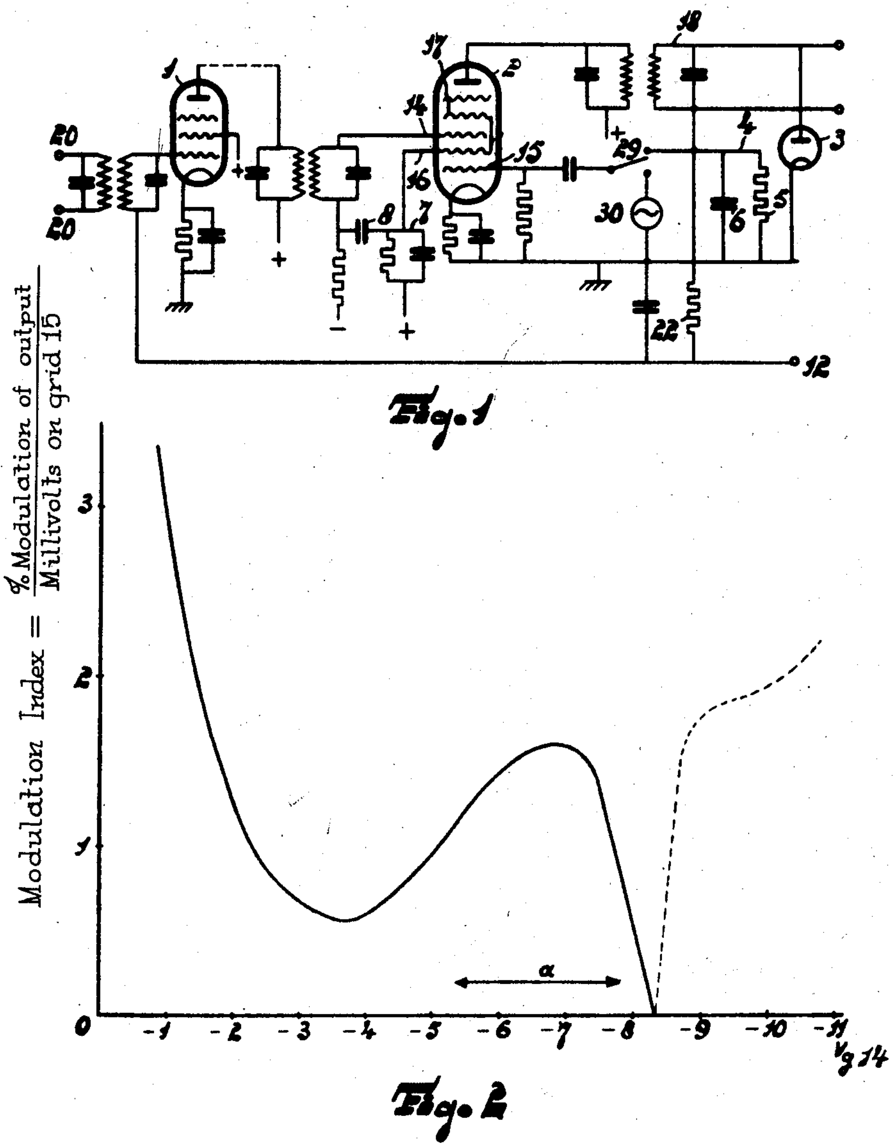

The invention relates to radio receiving circuit arrangements, more particularly for frequency-modulated oscillations with automatic gain control and comprising means to suppress unwanted amplitude modulation of the signal oscillations.

In a known circuit-arrangement for receiving frequency-modulated oscillations, means are provided to suppress undue amplitude modulation in which the oscillations produced across the output of the circuit arrangement are detected by an amplitude detector and an auxiliary oscillation corresponding to the unwanted amplitude modulation is developed. This is supplied, as a modulating oscillation, to one of the tube stages in the receiving channel before the said amplitude detector.

In the prior specification Serial No. 106,802, of Boelens, filed July 26, 1949, and assigned to the assignee of this application, there is described inter alia a circuit-arrangement in which this auxiliary oscillation is amplified by a tube comprising two control-grids and in which, in addition, modulation takes place in phase opposition to the unwanted amplitude modulation of the signal oscillations, so that the output of this tube has oscillations of substantially constant amplitude set up in it. The output circuit of the amplitude detector included in this circuit arrangement comprises two filters, one of which has the said auxiliary oscillation and the other an automatic gain control-voltage set up in it.

There is a limitation in that in the rectifier of the amplitude detector, for example a diode, a variable potential is effective at the cathode.

The invention has for its object to mitigate this disadvantage, so that the said diode may be readily combined with one of the other tubes included in the receiving channel.

The invention is based on recognition of the fact that the tube, or more generally an amplifying device, comprising two control-electrodes can be anomalously adjusted in a manner such that for suppressing the unwanted amplitude modulation the phase of the auxiliary oscillation must be inversed.

The invention is characterized by an electric amplifying device with the use of which the signal oscillation is amplified and modulated in phase opposition to the unwanted amplitude modulation, a control-electrode of this device having the auxiliary oscillation supplied to it, while the amplified auxiliary oscillation produced across one of the other electrodes of the amplifying device is fed, as a modulating oscillation, to the other control-electrode of the amplifying device, the amplifying device for the auxiliary oscillation being anomalously adjusted so that across a filter included in the output of the amplitude detector both the automatic gain control-voltage and the said auxiliary oscillation are produced.

In order that the invention may be readily carried into effect, one example will now be described in detail with reference to the accompanying drawings of which:

Fig. 1 is a circuit-diagram and

Fig. 2 indicates the characteristic curve of an amplifying device comprising two control-electrodes and used in the circuit of Fig. 1.

Referring to Fig. 1, the signal oscillations are fed through the input terminals 20 to the control-grid of a pre-amplifying stage 1, which is a high-frequency pre-amplifier, after which they are fed, if necessary after having passed through several subsequent stages, such as a mixing stage, to the second control-grid of an electric amplifying device 2 comprising two electrodes 14 and 15, which in this example is an electric discharge tube of the heptode type. The output of the amplifying device 2 comprises a tuned output circuit 18 across which the oscillations are set up, the unwanted amplitude modulation of which is suppressed. For this purpose the oscillations are fed via the circuit 18 to an amplitude detector 3 having an output filter 4 comprising a resistance 5 and a condenser 6, across which is produced an auxiliary oscillation which is also fed to the first control-electrode 15 of the amplifying device 2. A filter 7 included in the screen-grid 16 of this amplifying device has produced across it an amplified auxiliary oscillation which is fed to the other control-electrode, i. e. the control-electrode 14 with the result that a modulation of the signal oscillations corresponding to the unwanted amplitude modulation is obtained.

Fig. 2 shows the modulation percentage of the output oscillation per mv., if, for measuring purposes the connection between filter 4 and grid 15 is interrupted by operating the switch 29 and a separate auxiliary oscillation source 30 is connected into the circuit. In the case, it is observed that in the full part the modulation produced exhibits an anomalous character in that as the voltage across the control-grid 15 becomes higher negative and hence the amplified voltage across the control-grid 14 becomes less negative the conversion conductance of the amplifying device is decreased. It is surprising to find that this modulation, particularly in the part *a*, has a high value, so that satisfactory suppression of the unwanted amplitude modulation can be obtained, whilst the phase of the auxiliary voltage across the filter 4 has such polarity that this voltage can be fed, if necessary through a low-frequency smoothing filter 22, also as an automatic gain control-voltage to the control-grid of the tube. This voltage, may moreover, be taken from the terminal 12 and be fed to a tuning eye, by which correct tuning of the receiving circuit is indicated.

Of course, the switch 29 and the source 30 are missing from the final receiving circuit.

The circuit-arrangement shown in Fig. 1 may be modified in several ways. Thus, for example, the auxiliary oscillation may be fed to the grid 15 and the amplified auxiliary oscillation may be taken from the anode circuit of tube 2 and be fed to the control-grid 14, or the auxiliary oscillation may be fed to the control-grid 14 and the amplified auxiliary oscillation may be taken from the screen-grid circuit 16, or from the anode circuit of the discharge tube 2, the amplified auxiliary oscillation being then fed to the control-grid 15. Furthermore, the input oscillation may be rendered effective in the circuit of the control-grid 15 substituted for the circuit of the control-grid 14.

What I claim is:

1. In a receiver for a frequency modulated input wave exhibiting an unwanted amplitude modulation component, a system for amplifying said input wave while suppressing said unwanted component comprising an electron discharge tube having a cathode, two control grids and two additional electrodes, means to apply operating potentials to the respective electrodes of said tube, an input circuit coupled to one of said grids to apply said input wave thereto, an output circuit coupled to one of said additional electrodes to derive an amplified input wave therefrom, rectifier means coupled to said output circuit to extract from the amplified input wave an auxiliary oscillation corresponding to said unwanted component, means coupled to said rectifier means to apply said auxiliary oscillation to the other of said grids, means coupled to the other of said additional electrodes to derive an amplified auxiliary oscillation therefrom, and means to apply said amplified auxiliary oscillation to said one of said grids to produce intermodulation with the input wave, said operating potentials having relative values at which said intermodulation brings about substantial suppression of said unwanted component.

2. In a receiver, as set forth in claim 1, further including a preamplifying stage coupled to said input circuit for applying said input wave thereto and wherein said rectifying means in said system includes further means to produce a control voltage corresponding to the mean value of the input wave, said control voltage and said auxiliary oscillation produced by said rectifying means becoming more negative relative to a reference potential as a function of increasing amplitude values of said input wave, and means to apply said control voltage to said stage to effect automatic volume control thereof.

3. In a receiver for a frequency modulated input wave exhibiting an unwanted amplitude modulation component, a system for suppressing said unwanted component while amplifying said input wave, said system comprising an electron discharge tube having a cathode, first and second grids, a screen grid and an anode, means to apply operating potentials to the respective electrodes of the tubes, a resonant input circuit coupled to said first grid to apply said input wave thereto, a resonant output circuit coupled to said anode to derive an amplified input wave therefrom, rectifier means coupled to said output circuit to extract from the amplified wave an auxiliary oscillation corresponding to said unwanted component, means coupled to said rectifier means to apply said auxiliary oscillation to said second grid, a network coupled to said screen grid to obtain an amplified auxiliary oscillation therefrom, means coupled to said network to apply said amplified auxiliary oscillation to said first grid to produce intermodulation with said input wave, the operating potentials on said electrodes having relative values at which said intermodulation effectively cancels out said unwanted component.

WILLEM WIGGER BOELENS.

References Cited in the file of this patent

UNITED STATES PATENTS

| Number | Name | Date |
|---|---|---|
| 2,058,512 | Rust et al. | Oct. 27, 1936 |
| 2,251,382 | Sziklai | Aug. 5 1941 |
| 2,253,338 | Lewis | Aug. 19, 1941 |
| 2,264,724 | Schonfeld | Dec. 2, 1941 |
| 2,344,699 | Hunt | Mar. 21, 1944 |
| 2,363,649 | Crosby | Nov. 28, 1944 |
| 2,399,091 | Bingley | Apr. 23, 1946 |
| 2,420,249 | Korman | May 6, 1947 |